United States Patent
Watanabe

(10) Patent No.: US 10,746,757 B2
(45) Date of Patent: Aug. 18, 2020

(54) WHEEL SPEED ESTIMATION DEVICE

(71) Applicant: TOYOTA JIDOSHA KABUSHIKI KAISHA, Toyota-shi, Aichi-ken (JP)

(72) Inventor: Ryochi Watanabe, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 115 days.

(21) Appl. No.: 16/173,628

(22) Filed: Oct. 29, 2018

(65) Prior Publication Data

US 2019/0128917 A1 May 2, 2019

(30) Foreign Application Priority Data

Oct. 30, 2017 (JP) ................. 2017-208783

(51) Int. Cl.

| G01M 17/013 | (2006.01) |
|---|---|
| G01P 3/44 | (2006.01) |
| G01P 21/00 | (2006.01) |
| G01P 3/481 | (2006.01) |
| B60W 30/00 | (2006.01) |

(52) U.S. Cl.
CPC .............. *G01P 3/443* (2013.01); *B60W 30/00* (2013.01); *G01P 3/481* (2013.01); *G01P 21/00* (2013.01)

(58) Field of Classification Search
CPC .......................... G01M 17/007; G01M 17/013
USPC .............................. 73/115.01, 115.07, 115.08
See application file for complete search history.

(56) References Cited

U.S. PATENT DOCUMENTS

| 2002/0019717 | A1* | 2/2002 | Uchida ................... B60T 8/173 702/96 |
|---|---|---|---|
| 2007/0029127 | A1 | 2/2007 | Mori et al. |
| 2018/0281760 | A1* | 10/2018 | Watanabe ............. B60T 8/1766 |
| 2019/0084416 | A1* | 3/2019 | Watanabe ............. F16D 27/004 |
| 2019/0143955 | A1* | 5/2019 | Watanabe ....... B60W 30/18109 701/69 |
| 2019/0202440 | A1* | 7/2019 | Watanabe ............. B60W 10/119 |
| 2020/0031225 | A1* | 1/2020 | Watanabe ............. B60K 17/02 |
| 2020/0088756 | A1* | 3/2020 | Oh ........................ G01P 15/00 |

FOREIGN PATENT DOCUMENTS

| JP | 2007-045194 A | 2/2007 |
|---|---|---|
| JP | 2014-040225 A | 3/2014 |

* cited by examiner

Primary Examiner — Eric S. McCall
(74) Attorney, Agent, or Firm — Sughrue Mion, PLLC

(57) ABSTRACT

A wheel speed estimation device is to be applied to a four-wheel drive vehicle including a first coupling device for a rear left-wheel axle and a second coupling device for a rear right-wheel axle. These coupling devices respectively change states of engagement of a left engagement state and a right engagement state to the any one of a completely restraint state, a release state, and an incompletely restraint state. The wheel speed estimation device includes a correction parameter calculator that calculates correction parameters affected by a difference in wheel radius between wheels based on all wheel rotation speed signals, and a wheel speed calculator that calculates wheel speeds based on the wheel rotation speed signals and the correction parameters. Further, the correction parameter calculator stops calculation of the correction parameters when at least one of the left engagement state or the right engagement state is the incompletely restraint state.

6 Claims, 8 Drawing Sheets

WHEEL SPEED ESTIMATION DEVICE

BACKGROUND

1. Technical Field

The present invention relates to a wheel speed estimation device for a four-wheel drive vehicle.

2. Description of the Related Art

Hitherto, there has been known a four-wheel drive vehicle in which a first clutch is arranged between a drive output device of a rear-wheel final gear and a rear left-wheel axle and a second clutch is arranged between the drive output device and a rear right-wheel axle.

One of the four-wheel drive vehicle (hereinafter also simply referred to as "vehicle") has a gear ratio (hereinafter also referred to as "increased speed ratio") of a power transmission mechanism set so that a rotation speed of the drive output device of the rear-wheel final gear becomes higher than an average value of a rotation speed of a front left-wheel axle and a rotation speed of a front right-wheel axle. Further, for example, when the vehicle turns, a control device mounted in the vehicle increases a restraint force of a clutch corresponding to a rear wheel on the outer side of turning, and sets the restraint force of a dutch corresponding to a rear wheel on the inner side of turning to zero. As a result, the vehicle has an improved turning performance (for example, refer to Japanese Patent Application Laid-open (Kokai) No. 2007-45194).

Meanwhile, wheel slip control such as anti-skid control or traction control is executed based on a slip ratio of each wheel. The slip ratio of each wheel is calculated based on the wheel speed (=(tire radius)·(wheel rotation speed)) of each wheel.

The tire radius of each wheel (hereinafter referred to as "wheel radius") changes due to, for example, a tire pressure and a degree of tire wear. Accordingly, for example, in a case where wheel radii of two wheels are different from each other, wheel speeds are also different from each other even when wheel rotation speeds are the same as each other.

In view of the above, the inventor of the present invention have discussed a method involving calculating, for each wheel, a correction parameter indicating a degree of difference from a wheel radius of another wheel and calculating the wheel speed of each wheel based on the correction parameter and the wheel rotation speed of each wheel. This correction parameter is calculated based on an actual wheel rotation speed of each wheel and a relationship of "when the wheel speeds of two wheels are the same as each other, the wheel rotation speed of a wheel with a relatively larger wheel radius becomes relatively lower, whereas the wheel rotation speed of a wheel with a relatively smaller wheel radius becomes relatively higher". With this method, it is conceivable that the influence given to the wheel speed by the difference between wheel radii can be eliminated or reduced.

However, the inventor of the present invention have noticed that the following problem occurs when the method is applied to the four-wheel drive vehicle described above to estimate the wheel speed. Specifically, for example, when the restraint force of the first clutch described above is zero, a rear left wheel is a free wheel (driven wheel), and hence when the four-wheel drive vehicle is traveling straight ahead, the wheel speed of a front left wheel or a front right wheel and the wheel speed of the rear left wheel are equal to each other. At this time, when the wheel rotation speed of the front left wheel or the front right wheel and the wheel rotation speed of the rear left wheel are different from each other, the difference is due to a difference between the wheel radii. Thus, when the restraint force of the first clutch is zero, it is possible to calculate the correction parameter indicating the degree of difference in wheel radius of the rear left wheel based on the above-mentioned relationship and the wheel rotation speed of each wheel. Similarly, when the restraint force of the second clutch is zero, it is possible to calculate a correction parameter indicating a degree of difference in wheel radius of a rear right wheel.

However, when the restraint force of the first clutch is not zero, but has "such a magnitude that causes the rear left-wheel axle to slip relative to the drive output device", the above-mentioned relationship is not necessarily satisfied. For example, while the four-wheel drive vehicle is traveling straight ahead, although the wheel radius of the rear left wheel is larger than the wheel radii of the front left wheel and the front right wheel, the rear left wheel may rotate relatively fast due to the above-mentioned increased speed ratio. As a result, the wheel rotation speeds may be equal to each other. Thus, when the restraint force of the first clutch has "such a magnitude that causes the rear left-wheel axle to slip relative to the drive output device", calculation of the correction parameter based on the above-mentioned relationship may result in an erroneous value of the correction parameter. The same holds true for a case in which the restraint force of the second clutch has "such a magnitude that causes the rear right-wheel axle to slip relative to the drive output device". This results in a problem in that correction of the wheel speed through use of the correction parameter calculated in this manner also results in an erroneously corrected wheel speed.

SUMMARY

The present invention has been made in view of the above-mentioned problem. Specifically, regarding a four-wheel drive vehicle configured such that, when left and rear right-wheel engagement states are both a completely restraint state while the four-wheel drive vehicle is traveling straight ahead, a ratio of the rotation speed of each of left and rear right-wheel axles to an average value of the rotation speed of a front left-wheel axle and the rotation speed of a front right-wheel axle is a predetermined ratio larger than 1, the present invention has an object to provide a wheel speed estimation device for the four-wheel drive vehicle, which is capable of accurately calculating a correction parameter that changes depending on the degree of influence given to the wheel speed of each wheel by the difference between wheel radii of respective wheels, and calculating a correct wheel speed by using the correction parameter.

A wheel speed estimation device according to one embodiment of the present invention (hereinafter also referred to as "present invention device") is applied to a four-wheel drive vehicle (10).

The four-wheel drive vehicle includes a first coupling device (361) configured to change a rear left-wheel engagement state, which is a state of engagement between a drive output device (353), to which a driving torque generated by a drive source (20) is to be transmitted via a power transmission device (33, 34, 35), and a rear left-wheel axle (38L), to which a rear left wheel (WRL) is coupled, to any one of: a completely restraint state, which is a state in which the rear left-wheel axle rotates integrally with the drive output device; a release state, which is a state in which the rear left-wheel axle rotates freely relative to the drive output device; and an incompletely restraint state, which is a state in which the rear left-wheel axle rotates while slipping relative to the drive output device.

Further, the four-wheel drive vehicle includes a second coupling device (362) configured to change a rear right-wheel engagement state, which is a state of engagement between the drive output device (353) and a rear right-wheel axle (38R), to which a rear right wheel (WRR) is coupled, to any one of: a completely restraint state, which is a state in which the rear right-wheel axle rotates integrally with the drive output device; a release state, which is a state in which the rear right-wheel axle rotates freely relative to the drive output device; and an incompletely restraint state, which is a state in which the rear right-wheel axle rotates while slipping relative to the drive output device.

In addition, the four-wheel drive vehicle includes a controller (60) configured to control the rear left-wheel engagement state by using the first coupling device and to control the rear right-wheel engagement state by using the second coupling device.

The power transmission device is configured to have, when the rear left-wheel engagement state is the completely restraint state while the four-wheel drive vehicle is traveling straight ahead, as a predetermined ratio (RZ) larger than 1, a ratio of a "rotation speed of the rear left-wheel axle" to an "average value of a rotation speed of a front left-wheel axle (32L), to which a front left-wheel (WFL) is coupled, and a rotation speed of a front right-wheel axle (32R), to which a front right wheel (WFR) is coupled", and to have, when the rear right-wheel engagement state is the completely restraint state while the vehicle is traveling straight ahead, a ratio of a "rotation speed of the rear right-wheel axle" to "the average value" as the predetermined ratio (RZ).

The present invention device includes:

a plurality of rotation speed sensors (82) configured to generate wheel rotation speed signals corresponding to rotation speeds (Vwi) of the front left wheel, the front right wheel, the rear left wheel, and the rear right wheel, respectively;

a correction parameter calculator (60, Step 535) configured to calculate, for each wheel and based on all the wheel rotation speed signals, a correction parameter (Ki) that changes depending on a degree of influence given to a wheel speed of each wheel by a difference in wheel radius between wheels; and a wheel speed calculator (60, Step 630) configured to calculate the wheel speed (Vwi) of each wheel based on each of the wheel rotation speed signals and each correction parameter.

The first coupling device and the second coupling device are each constructed by any one of, for example, a multi-plate clutch, an electromagnetic dutch, or a combination of a multi-plate dutch and an electromagnetic dutch. With the above-mentioned configuration, when the left and rear right-wheel engagement states are both set to the completely restraint state, the rotation speeds of the left and rear right-wheel axles are higher than an average value of rotation speeds of the left and front right-wheel axles by the predetermined ratio (increased speed ratio). On the other hand, when the left and rear right-wheel engagement states are both set to the release state, the rotation speeds of the left and rear right-wheel axles are equal to the average value of rotation speeds of the left and front right-wheel axles. On the basis of this fact, it is considered that when the left and rear right-wheel engagement states are both set to the incompletely restraint state, the rotation speeds of the left and rear right-wheel axles are higher than the average value of rotation speeds of the left and front right-wheel axles by some indefinite value.

Thus, for example, even when the wheel radius of the rear left wheel (or rear right wheel) is the same as the wheel radii of the other wheels, calculation of the correction parameter at a time when the engagement state of the rear left wheel (or rear right wheel) is the incompletely restraint state results in the correction parameter for the rear left wheel (or rear right wheel) being equal to a value obtained when the wheel radius of the rear left wheel (or rear right wheel) is smaller than the wheel radii of the other wheels. Consequently, calculation of the wheel speed by using the correction parameter calculated in this manner also results in an erroneous value.

In view of the above, the correction parameter calculator is configured to stop ("No" at Step 430, Step 450, and "No" at Step 530) calculation of the correction parameter when at least one of the rear left-wheel engagement state or the rear right-wheel engagement state is the incompletely restraint state.

Therefore, with the present invention device, calculation of the correction parameter is stopped when the correction parameter is not to be calculated correctly (when at least one of rear left-wheel engagement state or rear right-wheel engagement state is incompletely restraint state). Thus, the correction parameter is more likely to be calculated correctly, and as a result, the wheel speed of each wheel is more likely to be calculated correctly.

In the wheel speed estimation device according to one aspect of the present invention, the correction parameter calculator is further configured to stop ("No" at Step 430, Step 450, and "No" at Step 530) calculation of the correction parameter when at least one of the rear left-wheel engagement state or the rear right-wheel engagement state is the completely restraint state.

According to this aspect, when at least one of the rear left-wheel engagement state or the rear right-wheel engagement state is set to at least one of the incompletely restraint state or the completely restraint state, calculation of the correction parameter is stopped (interrupted). In other words, calculation of the correction parameter is executed only when the rear left-wheel engagement state and the rear right-wheel engagement state are both set to the release state. That is, according to this aspect, calculation of the correction parameter is executed only when the left and rear right wheels are both free wheels. Therefore, with the present invention device, a correct value of the correction parameter can be calculated. As a result, the wheel speed of each wheel can be calculated accurately.

In the wheel speed estimation device according to one aspect of the present invention, the correction parameter calculator is configured to execute calculation of the correction parameter only when the rear left-wheel engagement state and the rear right-wheel engagement state are both the release state and only when the rear left-wheel engagement state and the rear right-wheel engagement state are both the completely restraint state. Further, the correction parameter calculator is configured to calculate (Step 520), when the rear left-wheel engagement state and the rear right-wheel engagement state are both the release state ("Yes" at Step 530), a calculation parameter (NPi(n)) correlated to a rotation angle of each wheel in a predetermined period based on each of the wheel rotation speed signals, to thereby calculate the correction parameter (Step 535) by using the calculation parameter. In addition, the correction parameter calculator is configured to calculate, when the rear left-wheel engagement state and the rear right-wheel engagement state are both the completely restraint state ("Yes" at Step 810), the calculation parameter based on each of the wheel rotation speed signals, to thereby calculate the correction parameter (Step 820) by using the calculation parameter (NPfl(n)) for the front left wheel, the calculation parameter (NPfr(n)) for the front right wheel, a value (NPrl(n)/RZ) obtained by dividing the calculation parameter (NPrl(n)) for the rear left wheel by the predetermined ratio, and a value (NPrr(n)/RZ) obtained by dividing the calculation parameter (NPrr(n)) for the rear right wheel by the predetermined ratio.

According to this aspect, calculation of the correction parameter is executed also when the left and rear right-wheel engagement states are both the completely restraint state in addition to the case of the left and rear right-wheel engagement states being both the release state. At this time, the present invention device divides the calculation parameter for the rear left wheel and the calculation parameter for the rear right wheel by the predetermined ratio among the calculation parameters (e.g., integrated number of pulses based on wheel rotation speed signals generated by rotation speed sensor) for calculating the correction parameters for respective wheels. This is a result of considering the fact that the wheel speed of the rear left wheel and the wheel speed of the rear right wheel are higher than the wheel speed of the front left wheel and the wheel speed of the front right wheel by the predetermined ratio when the left and rear right-wheel engagement states are both the completely restraint state. With this, the correction parameter can be calculated correctly even when the rear left-wheel engagement states and the rear right-wheel engagement states are both the completely restraint state. As a result, the opportunity of being capable of executing calculation of the correction parameter substantially increases, and thus the correction parameter converges earlier.

In the wheel speed estimation device according to one aspect of the present invention, the correction parameter calculator is configured to update, during one trip period from start of a current operation of the vehicle to end of the current operation, the correction parameter every time a predetermined period elapses when calculation of the correction parameter is not stopped, and the correction parameter calculator is further configured to: initialize the correction parameter when the vehicle starts the current operation; and stop (Step 550) update of the correction parameter from when a first convergence condition and a second convergence condition are both satisfied ("Yes" at Step 540 and "Yes" at Step 545) until the end of the current operation, the first convergence condition being satisfied when a magnitude (|Ki(n)−Ki(n−1)|) of a deviation between a current correction parameter (Ki(n)), which is a correction parameter updated at a current time, and a previous correction parameter (Ki(n−1)), which is a correction parameter updated the predetermined period before the current time, at which the correction parameter is updated, is equal to or smaller than a first predetermined deviation (ΔK1), the second convergence condition being satisfied when at least one of a condition that a magnitude (|Kfl(n)−Kfr(n)|) of a deviation between a correction parameter (Kfl(n)) for the front left wheel and a correction parameter (Kfr(n)) for the front right wheel is equal to or smaller than a second predetermined deviation (ΔK2) or a condition that a magnitude (|Krl(n)−Krr(n)|) of a deviation between a correction parameter (Krl(n)) for the rear left wheel and a correction parameter (Krr(n)) for the rear right wheel is equal to or smaller than a third predetermined deviation (ΔK3) is satisfied.

For example, the first convergence condition is less likely to be satisfied when the vehicle is traveling on a rough road, whereas the first convergence condition is more likely to be satisfied when the vehicle is traveling on a flat road for a longer period of time. Further, the second convergence condition is less likely to be satisfied when the vehicle is traveling on a curvy road, whereas the second convergence condition is more likely to be satisfied when the vehicle is traveling straight ahead for a longer period of time. Meanwhile, the correction parameter calculated when the vehicle is traveling on a flat road is more likely to be accurate than the correction parameter calculated when the vehicle is traveling on a rough road. The correction parameter calculated when the vehicle is traveling straight ahead is more likely to be accurate than the correction parameter calculated when the vehicle is traveling on a curvy road. Therefore, according to this aspect, the first convergence condition and the second convergence condition can be satisfied under a state in which the correction parameter is more likely to be calculated accurately.

In the descriptions given above, in order to facilitate understanding of the present invention, names and/or reference symbols used in embodiments of the present invention described below are enclosed in parentheses, and are assigned to elements of the invention corresponding to the embodiments. However, the respective elements of the present invention are not limited to the embodiments defined by the names and/or the reference symbols. Other objects, other features, and accompanying advantages of the present invention are readily understood from a description of the embodiments of the present invention to be given referring to the following drawings.

DETAILED DESCRIPTION

First Embodiment (Configuration)

Figure 1:
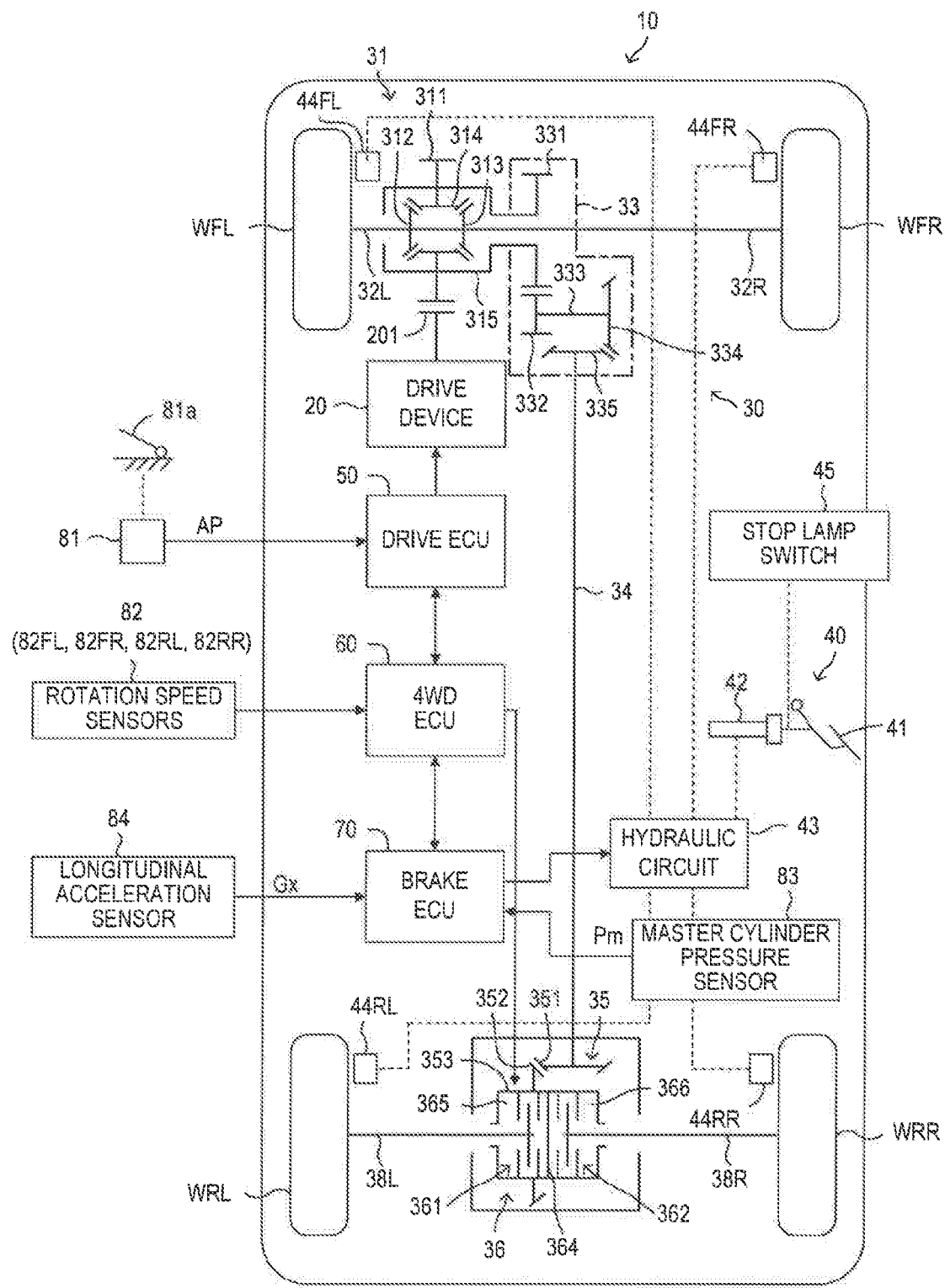
FIG. 1 is a schematic configuration diagram for illustrating a control device for a four-wheel drive vehicle according to a first embodiment of the present invention.

As illustrated hi FIG. 1, a control device for a four-wheel drive vehicle according to a first embodiment of the present invention (hereinafter also referred to as "first device") is applied to a four-wheel drive vehicle (vehicle) 10.

The vehicle 10 includes, for example, a drive device 20 (drive source), a power transmission device 30, a braking device 40, a drive ECU 50, a 4WD ECU 60, and a brake ECU 70. Two or more ECUs among those ECUs may be integrated into one ECU.

The ECU is an abbreviated word for an electronic control unit, and is an electronic control circuit including as its main component a microcomputer including a CPU, a ROM, a RAM, a backup RAM (or nonvolatile memory), and an interface I/F. The CPU executes instructions (routines) stored in a memory (ROM), to thereby implement various functions described later.

The drive device 20 is configured to generate a driving force for driving wheels (front left wheel WFL, front right wheel WFR, rear left wheel WRL, and rear right wheel WRR) of the vehicle 10. The driving force generated by the drive device 20 is transmitted to the wheels of the vehicle 10 via the power transmission device 30. The drive device 20 is constructed of a combination of an internal combustion engine and a transmission. Alternatively, the drive device 20 may be, for example, a combination of an electric motor and a transmission, or a drive device for a hybrid system, which is a combination of an internal combustion engine, an electric motor, and a transmission.

The power transmission device 30 includes, a front-wheel differential device 31, a front left wheel axle 32L, a front right wheel axle 32R, a transfer gear device 33, a propeller shaft 34, a rear-wheel final gear device 35, a clutch device 36, a rear left wheel axle 38L, a rear right wheel axle 38R, and the like.

The front-wheel differential device 31 includes a drive gear 311, a left side gear 312, a right side gear 313, a pinion gear 314, and a front differential case 315. The drive gear 311 meshes with a transmission output gear 201 configured to output a driving force generated by the drive device 20. The left side gear 312 is directly coupled to the front left wheel axle 32L, and rotates integrally with the front left wheel axle 32L. The right side gear 313 is directly coupled to the front right wheel axle 32R, and rotates integrally with the front right wheel axle 32R. The pinion gear 314 meshes with the left side gear 312 and the right side gear 313. The front differential case 315 is directly coupled to the drive gear 311 and rotates integrally with the drive gear 311, and accommodates the left side gear 312, the right side gear 313, and the pinion gear 314. With this configuration, the front-wheel differential device 31 distributes the driving force generated by the drive device 20 to the front left wheel axle 32L and the front right wheel axle 32R while allowing a differential therebetween.

The transfer gear device 33 includes an input gear 331, a counter gear 332, a counter shaft 333, a first ring gear 334, and a first pinion gear 335. The input gear 331 is directly coupled to the front differential case 315, and rotates integrally with the front differential case 315. The counter gear 332 meshes with the input gear 331. The counter gear 332 is fixed to one end of the counter shaft 333 and the first ring gear 334 is fixed to the other end thereof. Thus, the first ring gear 334 rotates integrally with the counter gear 332. The first pinion gear 335 meshes with the first ring gear 334, and is fixed to a front end of the propeller shaft 34. Thus, the propeller shaft 34 rotates integrally with the first pinion gear 335.

The rear-wheel final gear device 35 includes a second pinion gear 351, a second ring gear 352, and a rear differential case 353. The second pinion gear 351 is fixed to a rear end portion of the propeller shaft 34, and rotates integrally with the propeller shaft 34. The second ring gear 352 meshes with the second pinion gear 351. The rear differential case 353 is a cylindrical case, which is provided coaxially with the rear left wheel axle 38L and the rear right wheel axle 38R, and is directly coupled to the second ring gear 352. Accordingly, the rear differential case 353 is configured to rotate around the rear left wheel axle 38L and the rear right wheel axle 38R integrally with the second ring gear 352. The rear differential case 353 is also referred to as "drive output device".

The clutch device 36 includes a first clutch 361 and a second clutch 362. The first clutch 361 and the second clutch 362 are also referred to as "first coupling device 361" and "second coupling device 362" respectively. When the first clutch 361 and the second clutch 362 are described without particular distinction, those clutches are also simply referred to as "clutch".

A partition wall 364 is provided in the middle of the rear differential case 353 in its axial direction (lateral direction of the vehicle). A first clutch chamber 365 is formed on a vehicle's left side of the partition wall 364, and a second clutch chamber 366 is formed on a vehicle's right side of the partition wall 364. The first clutch 361 and the second clutch 362 are accommodated in the first clutch chamber 365 and the second clutch chamber 366, respectively. This configuration of the clutch device 36 is known. Japanese Patent Application Laid-open (Kokai) No. 2007-45194, in which the configuration of the clutch device 36 is described, is incorporated herein by reference. The first clutch 361 and the second clutch 362 are a combination of a multi-plate clutch and an electromagnetic clutch, which constructs a clutch capable of changing coupling torques of the first clutch 361 and the second clutch 362 independently of each other in response to an instruction from the 4WD ECU 60.

The first clutch 361 can change a coupling torque between the drive output device (rear differential case) 353 and the rear left-wheel axle 38L. With this, the engagement state between the drive output device 353 and the rear left-wheel axle 38L (hereinafter referred to as "first engagement state") can be changed to any one of a release state, a completely restraint state, and an incompletely restraint state.

More specifically, when the coupling torque is set to a value smaller than a "first threshold torque Tcth1" ("0" in this example), the first clutch 361 sets the first engagement state to the release state. When the first engagement state is set to the release state, the rear left-wheel axle 38L is not engaged with the drive output device 353, and can rotate freely relative to the drive output device 353. Therefore, when the first engagement state is the release state, the rear left wheel WRL is a free wheel (driven wheel or rolling wheel).

When the coupling torque is set to a "value (maximum value Tcmax in this example) equal to or larger than a second threshold torque Tcth2 larger than the first threshold torque Tcth1", the first clutch 361 sets the first engagement state to the completely restraint state. When the first engagement state is set to the completely restraint state, the rear left-wheel axle 38L is completely engaged with the drive output device 353, and rotates integrally with the drive output device 353. Therefore, when the first engagement state is the completely restraint state, the rear left wheel WRL is a drive wheel.

When the coupling torque is set to a "value equal to or larger than the first threshold torque Tcth1 and smaller than the second threshold torque Tcth2", the first clutch 361 sets the first engagement state to the incompletely restraint state. When the first engagement state is set to the incompletely restraint state, the rear left-wheel axle 38L rotates while slipping relative to the drive output device 353.

The second clutch 362 can change a coupling torque between the drive output device (rear differential case) 353 and the rear right-wheel axle 38R in the same manner as the first clutch 361. With this, the second clutch 362 can change the engagement state between the drive output device 353 and the rear right-wheel axle 38R (hereinafter referred to as "second engagement state") to any one of a release state, a completely restraint state, and an incompletely restraint state.

More specifically, when the coupling torque is set to a value smaller than the first threshold torque Tcth1, the second clutch 362 sets the second engagement state to the release state. When the second engagement state is set to the release state, the rear right-wheel axle 38R is not restrained by the drive output device 353, and can rotate freely relative to the drive output device 353. Therefore, when the second engagement state is the release state, the rear right wheel WRR is a free wheel.

When the coupling torque is set to a value equal to or larger than the second threshold torque Tcth2, the second clutch 362 sets the second engagement state to the completely restraint state. When the second engagement state is set to the completely restraint state, the rear right-wheel axle 38R is completely restrained by the drive output device 353, and rotates integrally with the drive output device 353. Therefore, when the second engagement state is the completely restraint state, the rear right wheel WRR is a drive wheel.

When the coupling torque is set to a "value equal to or larger than the first threshold torque Tcth1 and smaller than the second threshold torque Tcth2", the second clutch 362 sets the first engagement state to the incompletely restraint state. When the second engagement state is set to the incompletely restraint state, the rear right-wheel axle 38R rotates while slipping relative to the drive output device 353.

Meanwhile, the power transmission device 30 is configured to, when the vehicle 10 is traveling straight ahead, set the wheel rotation speeds of the rear wheels (rear left wheel WRL and rear right wheel WRR) so that those wheel rotation speeds are higher than the wheel rotation speeds of the front wheels (front left wheel WFL and front right wheel WFR). Specifically, when the first engagement state and the second engagement state are both the completely restraint state, the gear ratio of the power transmission device 30 is set so that each of the rotation speeds of the rear left-wheel axle 38L and the rear right-wheel axle 38R is higher than an average value of the rotation speed of the front left-wheel axle 32L and the rotation speed of the front right-wheel axle 32R. This gear ratio is a ratio (increased speed ratio) RZ of the rotation speed of the rear differential case 353 to the rotation speed of the front differential case 315, and is set to a predetermined ratio larger than "1". In this example, the increased speed ratio RZ is set to "1.02", With this setting, the rotation speed of the rear differential case 353 is 2% higher than the rotation speed of the front differential case 315.

The increased speed ratio RZ is set in this manner for the following reason. Specifically, for example, when the vehicle 10 is turning right, a wheel speed Vwfl of the front left wheel WFL is higher than an average wheel speed Vwf (=(Vwfl+Vwfr)/2) of the front wheels, and a wheel speed Vwfr of the front right wheel WFR is lower than the average wheel speed Vwf of the front wheels.

Figure 2:
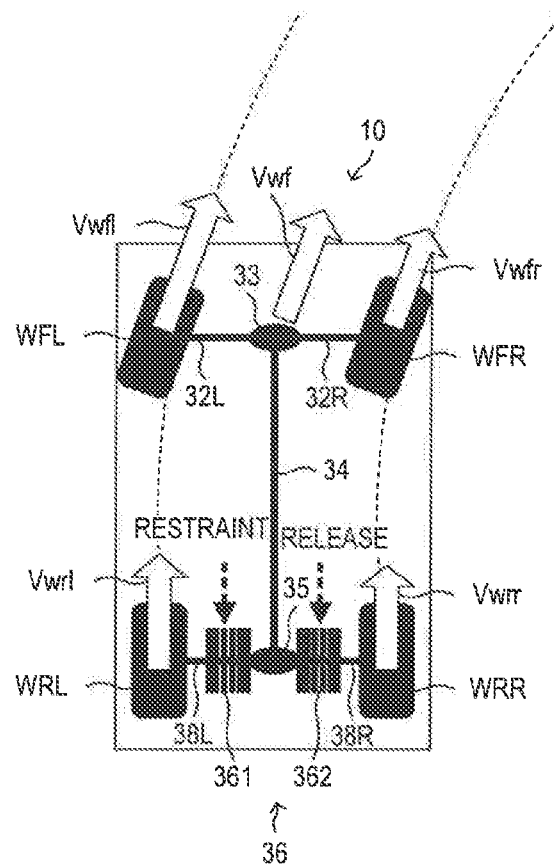
FIG. 2 is a diagram for illustrating a wheel speed of each wheel of a vehicle having an increased speed ratio of "1" and turning right.

In this case, when the increased speed ratio RZ is set to "1", as illustrated in FIG. 2, the wheel speed Vwrl and the wheel speed Vwrr do not become higher than the average wheel speed Vwf of the front wheels. Therefore, when the first engagement state is set to the completely restraint state, the wheel speed Vwrl of the rear left wheel WRL is equal to or lower than the wheel speed Vwfl of the front left wheel WFL, and thus the rear left wheel WRL generates a braking force.

Figure 3:
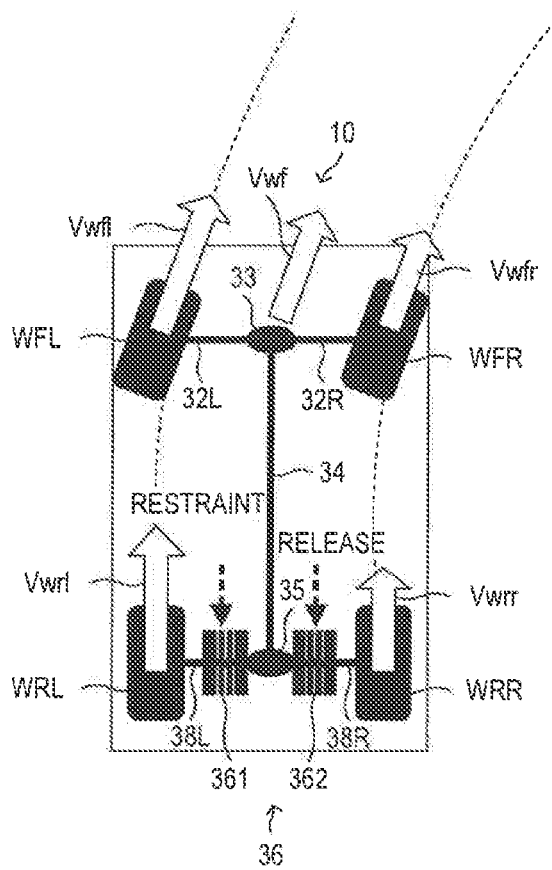
FIG. 3 is a diagram for illustrating a wheel speed of each wheel of the vehicle illustrated in FIG. 1 (vehicle having an increased speed ratio larger than "1") turning right.

Meanwhile, in a case where the increased speed ratio RZ is set to 1.02, as in the first embodiment, as illustrated in FIG. 3, when the wheel speed Vwrl of the rear left wheel WRL has a turning radius of about 50 m or more, the wheel speed Vwrl of the rear left wheel WRL becomes higher than the average wheel speed Vwf of the front wheels. Therefore, the first device can use the driving force of the rear left wheel WRL as a force to assist the vehicle 10 to turn right. Also in the case of the vehicle 10 turning left, when the increased speed ratio RZ is set to 1.02 ("larger than 1"), the first device can use the driving force of the rear right wheel WRR as a force to assist the vehicle 10 to turn left.

Referring to FIG. 1 again, the braking device 40 includes, a brake pedal 41, a master cylinder 42, a hydraulic circuit 43, wheel cylinders 44 (44FL, 44FR, 44RL, and 44RR), a stop lamp switch 45, and the like.

The braking force to be applied to each of the front left wheel WFL, the front right wheel WFR, the rear left wheel WRL, and the rear right wheel WRR are controlled by the hydraulic circuit 43 of the braking device 40 controlling a braking pressure of the corresponding wheel cylinders 44FL, 44FR, 44RL, and 44RR. The hydraulic circuit 43 includes a reservoir, oil pumps, and other various valve devices (not shown), and functions as a brake actuator. The stop lamp switch 45 is a switch configured to change the state by an operation of depression on the brake pedal 41 by a driver. The stop lamp switch 45 outputs "0" when the brake pedal depression amount is smaller than a predetermined amount, and outputs "1" when the brake pedal depression amount is equal to or larger than the predetermined amount.

The drive ECU 50, the 4WD ECU 60, and the brake ECU 70 are connected to one another through controller area network (CAN) communication in a manner that allows those ECUs to exchange information thereamong. The drive ECU 50 is electrically connected to various sensors including an accelerator opening degree sensor 81, and is configured to receive output signals from those sensors. The accelerator opening degree sensor 81 is configured to generate an output signal indicating a depression amount (hereinafter also referred to as "accelerator opening degree") AP of an accelerator pedal 81a, which is provided so as to be operable by the driver. The drive ECU 50 is electrically connected to the drive device 20. The drive ECU 50 is configured to transmit various signals for controlling the drive device 20 based on the depression amount AP of the accelerator pedal 81a and an operation of a shift lever (not shown).

The 4WD ECU 60 is electrically connected to various sensors including rotation speed sensors 82 (82FL, 82FR, 82RL, and 82RR) of the wheels, and receives output signals from those sensors. The 4WD ECU 60 and the rotation speed sensors 82 construct a wheel speed estimation device.

The rotation speed sensors 82 each generate one pulse every time its corresponding wheel (rotor fixed to wheel in actuality) rotates by a certain angle. The 4WD ECU 60 counts the number of pulses generated by each of the rotation speed sensors 82 per unit time, acquires, from the count value, the rotation speed of each of the wheels in which the rotation speed sensors 82 are installed, and calculates a wheel speed Vw based on the rotation speed. More specifically, the wheel speed Vw is calculated based on the equation (1) given below. In equation (1), ri represents a dynamic radius (namely, wheel radius) of a wheel i, ωi represents an angular velocity (rotation speed) of the wheel i, N represents the number of teeth of the rotor (number of pulses generated per rotation of rotor fixed to wheel i), and NPXi represents the number of pulses counted per unit time (measurement time) ΔT. The subscript i represents the position of the corresponding wheel. The subscripts i corresponding to the front left wheel WFL, the front right wheel WFR, the rear left wheel WRL, and the rear right wheel WRR are fl, fr, rl, and rr, respectively.

$$Vwi = ri \cdot \omega i = ri \cdot (2 \cdot \pi / N) \cdot (NPXi / \Delta T) \tag{1}$$

The 4WD ECU 60 is configured to acquire (estimate by calculation) a wheel speed Vwfl of the front left wheel WFL, a wheel speed Vwfr of the front right wheel WFR, a wheel speed Vwrl of the rear left wheel WRL, and a wheel speed Vwrr of the rear right wheel WRR in this manner.

The 4WD ECU 60 is further electrically connected to the rear-wheel final gear device 35, and is configured to control coupling torques of the first clutch 361 and the second clutch 362 based on, the accelerator opening degree AP, the wheel speeds Vwfl, Vwfr, Vwrl, and Vwrr, and the like.

The brake ECU 70 is electrically connected to, a master cylinder pressure sensor 83, a longitudinal acceleration sensor 84, and the like, and receives output signals from those sensors. The master cylinder pressure sensor 83 generates an output signal representing a master cylinder pressure Pm. The longitudinal acceleration sensor 84 generates an output signal representing a longitudinal acceleration Gx of the vehicle 10. The longitudinal acceleration sensor 84 outputs a positive value when the vehicle 10 is accelerating in a forward direction.

Further, the brake ECU 70 calculates respective target braking forces Fbflt, Fbfrt, Fbrlt, and Fbrrt of the front left wheel WFL, the front right wheel WFR, the rear left wheel WRL, and the rear right wheel WRR based on the master cylinder pressure Pm, and controls respective braking pressures of the wheel cylinders 44FL, 44FR, 44RL, and 44RR so that the braking force of each wheel achieves the target braking force.

(Outline of Operation)

The first device calculates the wheel speed of each wheel in accordance with equation (1) given above. The wheel radius ri may be different between wheels depending on, for example, a difference in tire pressure between wheels and a difference in degree of tire wear. Now, when a reference value (normal value) of the wheel radius ri is set to r0, the wheel radius ri is represented by Ki·r0 by using a coefficient Ki. That is, the first device calculates the wheel speed Vwi of the wheel i in accordance with equation (2) given below. The coefficient Ki is also referred to as "correction parameter" or "correction coefficient".

$$Vwi = ri \cdot \omega i = (Ki \cdot r0) \cdot \omega i \tag{2}$$

The first device calculates the coefficient Ki in the following manner in order to calculate the wheel speed Vwi in accordance with equation (2) given above. The coefficient Ki acquired by the following technique is not a true value but an approximate value.

First, the first device integrates, for each wheel, the number of pulses, which are output by the corresponding rotation speed sensor 82 after an ignition key switch (not shown) of the vehicle 10 is changed from an off position to an on position, to thereby calculate an integrated number of pulses NPi of each wheel. The integrated number of pulses NPi is represented by equation (3) given below, NPi(n) represents the number of pulses integrated in a period (namely, one calculation period ΔT) from a previous calculation timing to a current calculation timing. NPi(n−1) represents the integrated number of pulses updated in the previous calculation timing. As described later, the first device integrates the number of pulses only in a period in which the first engagement state and the second engagement state are both the release state.

$$NPi(n) = NPi(n-1) + NPXi \tag{3}$$

Next, the first device calculates a total sum PM of the integrated numbers of pulses NPi(n) of the respective wheels i in accordance with equation (4) given below.

$$PM(n) = \Sigma NPi(n) = NPfl(n) + NPfr(n) + NPrl(n) + NPrr(n) \tag{4}$$

The first device calculates a correction coefficient Ki(n) for each wheel i based on the total sum PM(n) of the integrated numbers of pulses of the four wheels and the integrated number of pulses NPi(n) of each wheel in accordance with equation (5) given below. The first device repeats calculation of the correction coefficient Ki(n) for each wheel every time a unit period (one calculation period) ΔT elapses. In other words, the correction coefficient Ki(n) for each wheel is updated every time the unit period ΔT elapses. Equation (5) is derived based on knowledge that as the wheel radius of a certain wheel i becomes smaller, the integrated number of pulses NPi of that wheel i becomes larger.

$$Ki(n) = PM(n) / (4 \cdot NPi(n)) \tag{5}$$

As shown in equation (1), the angular velocity (rotation speed) of the wheel i is $(2 \cdot \pi / N) \cdot (NPXi / \Delta T)$, and thus the first device calculates the wheel speed Vwi of the wheel i in accordance with equation (6) given below.

$$Vwi = Ki(n) \cdot r0 \cdot (2 \cdot \pi / N) \cdot (NPXi / \Delta T) \tag{6}$$

Meanwhile, the first device updates the integrated number of pulses NPi(n) and the correction coefficient Ki(n) only in the period in which the first engagement state and the second engagement state are both the release state. That is, when at least one of the first engagement state or the second engagement state is any one of the incompletely restraint state and the completely restraint state, the first device stops calculation (update) of the integrated number of pulses NPi(n) and the correction coefficient Ki(n). Now, the reason will be described below. In the following, for the sake of simplicity of description, it is assumed that the vehicle 10 is traveling straight ahead at a constant speed on a flat road, and the wheel radii n of the wheels are the same as each other.

Now, it is assumed that the first engagement state and the second engagement state are both the completely restraint state. In this case, each of the rotation speeds of the rear left wheel WRL and the rear right wheel WRR is higher than any one of the rotation speeds of the front left wheel WFL and the front right wheel WFR due to the above-mentioned increased speed ratio RZ. Thus, when the vehicle 10 has traveled by a certain distance, each of the integrated numbers of pulses NPi(n) of the rear left wheel WRL and the rear right wheel WRR is larger than any one of the integrated numbers of pulses NPi(n) of the front left wheel WFL and the front right wheel WFR. As a result, the correction coefficients Ki(n) for the rear left wheel WRL and the rear right wheel WRR are different from the correction coefficients Ki(n) for the front left wheel WFL and the front right wheel WFR. That is, in this case, the wheel radius of the rear wheel is erroneously considered to be smaller than the wheel radius of the front wheel even though the wheel radius of the front wheel and the wheel radius of the rear wheel are the same. This error also occurs for a rear wheel in the completely restraint state when any one of the first engagement state or the second engagement state is the completely restraint state. This is the reason why, when at least one of the first engagement state or the second engagement state is the completely restraint state, update of the integrated number of pulses NPi(n) and the correction coefficient Ki(n) is stopped.

Next, it is assumed that at least one of the first engagement state or the second engagement state is the incompletely restraint state. In this case, each of the rotation speeds of the rear left wheel WRL and the rear right wheel WRR is higher than any one of the rotation speeds of the front left wheel WFL and the front right wheel WFR. Thus, similarly to the case of the completely restraint state, when the vehicle 10 has traveled by a certain distance, each of the integrated numbers of pulses NPi(n) of the rear left wheel WRL and the rear right wheel WRR is higher than any one of the integrated numbers of pulses NPi(n) of the front left wheel WFL and the front right wheel WFR. As a result, the correction coefficients Ki(n) for the rear left wheel WRL and the rear right wheel WRR are different from the correction coefficients Ki(n) for the front left wheel WFL and the front right wheel WFR. That is, also in this case, the wheel radius of the rear wheel is erroneously considered to be smaller than the wheel radius of the front wheel even though the wheel radius of the front wheel and the wheel radius of the rear wheel are the same. This is the reason why, when at least one of the first engagement state or the second engagement state is the incompletely restraint state, update of the integrated number of pulses NPi(n) and the correction coefficient Ki(n) is stopped.

In contrast, when the first engagement state and the second engagement state are both the release state, the rear left wheel WRL and the rear right wheel WRR are free wheels. Thus, the wheel speed of the rear wheel and the wheel speed of the front wheel are the same. In this case, the rotation speed of each wheel is a value that has reflected the wheel radius of each wheel, and thus the correction coefficient Ki is accurately calculated as a value that has reflected the wheel radius ri of each wheel.

Next, when the following two convergence conditions (a) and (b) are both satisfied, the first device stops update of the correction coefficient. On the other hand, when at least one of the convergence condition (a) or (b) is not satisfied, the first device continues to update the correction coefficient.

[Convergence Conditions]

(a) A magnitude |Ki(n)−Ki(n−1)| of a deviation (hereinafter also referred to as "time deviation") between the latest value (namely, currently calculated value) Ki(n) of the correction coefficient Ki updated for each wheel and a value (namely, previously calculated value) Ki(n−1) updated a predetermined time before (unit period ΔT before) the currently calculated value Ki(n) is equal to or smaller than a predetermined first deviation ΔK1.

(b) A magnitude |Kfl(n)−Kfr(n)| of a deviation (hereinafter also referred to as "front right and left wheel deviation") between the correction coefficient Kfl(n) of the front left wheel WFL and the correction coefficient Kfr(n) of the front right wheel WFR is equal to or smaller than a predetermined second deviation ΔK2. Alternatively, a magnitude |Krl(n)−Krr(n)| of a deviation (hereinafter also referred to as "rear right and left wheel deviation") between a correction coefficient Krl(n) of the rear left wheel WRL and a correction coefficient Krr(n) of the rear right wheel WRR is equal to or smaller than a predetermined third deviation ΔK3.

Now, the above-mentioned convergence conditions will be described. For example, when the vehicle 10 is traveling on a rough road, the number of pulses output from the rotation speed sensors 82 in a measurement period ΔT changes. Therefore, when the vehicle 10 continues to travel on a rough road, the magnitude of a time deviation is less likely to become small. In other words, the above-mentioned convergence condition (a) is satisfied when the period in which the correction coefficient Ki is updated while the vehicle is traveling on a flat road becomes a certain period or more.

For example, when the vehicle 10 is traveling on a curvy road, the magnitude of the front right and left wheel deviation and the magnitude of the rear right and left wheel deviation are less likely to become small. In other words, the above-mentioned convergence condition (b) is satisfied when a ratio of a "period in which the correction coefficient Ki is updated while the vehicle 10 is traveling straight ahead" to an entire period in which the correction coefficient Ki is updated is equal to or larger than a certain value.

The above-mentioned convergence condition (b) is satisfied when any one of conditions, namely, a condition (b1) that the magnitude of the front right and left wheel deviation is equal to or smaller than the predetermined second deviation ΔK2 and a condition (b2) that the magnitude of the rear right and left wheel deviation is equal to or smaller than the predetermined third deviation ΔK3. This is because, for example, when only one front wheel out of the four wheels has a wheel radius significantly different from the wheel radii of the other wheels, the magnitude of the front right and left wheel deviation is less likely to converge. On the other hand, when the subject wheel is a rear wheel, the magnitude of the rear right and left wheel deviation is less likely to converge. Therefore, when only one of the conditions (b1) and (b2) is set as the convergence condition, this convergence condition may not be satisfied. In view of the above, the convergence condition (b) is satisfied when at least one of the condition (b1) or (b2) is satisfied.

(Specific Operation)

<Correction Coefficient Calculation Execution Determination>

Figure 4:
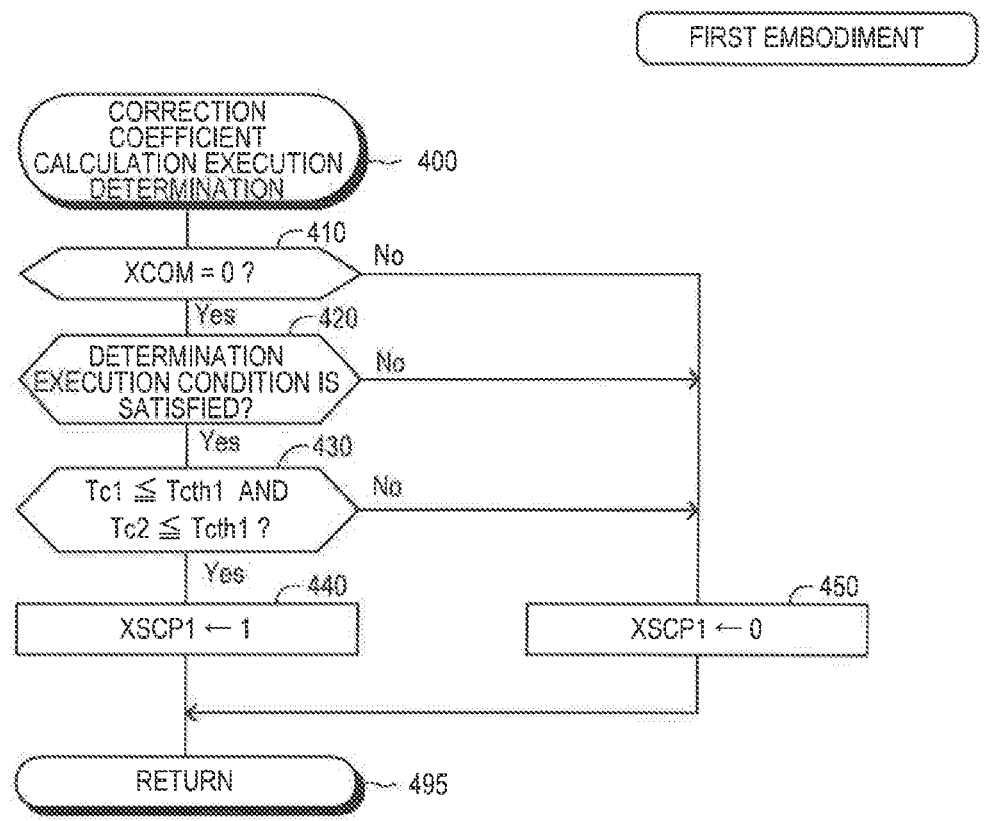
FIG. 4 is a flowchart for illustrating "correction coefficient calculation execution determination routine" executed by a CPU of a 4WD ECU illustrated in FIG. 1.

Hereinafter, actual operation of the first device will be described with reference to FIG. 4 to FIG. 6. The CPU of the 4WD ECU 60 (hereinafter simply referred to as "CPU") is configured to execute a correction coefficient calculation execution determination routine illustrated by a flowchart of FIG. 4 every time a constant time elapses.

Thus, the CPU starts the process from Step 400 at a certain time point to proceed to Step 410 at which the CPU determines whether a value of a correction coefficient update completion flag (hereinafter also simply referred to as "update completion flag") XCOM is "0". That is, at Step

410, the CPU determines whether update of the correction coefficient is incomplete. When the ignition key switch (not shown) is changed from an off position to an on position (hereinafter simply referred to as "at the time of IG on"), the update completion flag XCOM is set to "0", whereas when update of the correction coefficient is complete (when convergence condition (a) and convergence condition (b) are both satisfied), the update completion flag XCOM is set to "1".

When the value of the update completion flag XCOM is "1" (update of correction coefficient is already complete), the correction coefficient is not required to be calculated. Thus, the CPU makes "No" determination at Step 410 to directly proceed to Step 450 at which the CPU sets the value of a first correction coefficient execution flag XSCP1 to "0". Subsequently, the CPU proceeds to Step 495 to tentatively terminate the present routine. The first correction coefficient execution flag XSCP1 is hereinafter also referred to as "first calculation execution flag XSCP1" On the other hand, when the value of the update completion flag XCOM is "0" (when update of the correction coefficient is incomplete), the CPU makes "Yes" determination at Step 410 to proceed to Step 420.

At Step 420, the CPU determines whether the following condition for executing correction coefficient calculation execution determination is satisfied. The condition for executing correction coefficient calculation execution determination is, for example, as follows.

(1) Anti-skid control (anti-lock braking system (ABS)), vehicle stability control (VSC), and traction control (TRC) are off (not activated).

At the time of activation of the ABS, the brake pedal 41 of the vehicle 10 is strongly depressed on, whereas at the time of activation of the TRC, the accelerator pedal 81a is strongly depressed on. In such a state, the vehicle 10 may rapidly accelerate/decelerate or wheel slip may be occurring. At the time of activation of the VSC, a braking force for preventing side slip of the vehicle 10 is generated, and rapid deceleration and slip may be occurring. Therefore, one execution condition is that the ABS the VSC, and the TRC are off.

(2) The vehicle 10 is not being braked (stop lamp switch 45 is off).

When the wheels are being braked, loads on the front wheels are increased, and loads on the rear wheels are decreased. Thus, the slip ratio of the front wheel becomes lower, whereas the slip ratio of the rear wheel becomes higher. As a result, a difference between the wheel speed of the front wheel and the wheel speed of the rear wheel becomes larger.

(3) The vehicle 10 is not in an acceleration slip state (difference ΔG between wheel acceleration Gw calculated from wheel speed Vw and acceleration Gx detected by longitudinal acceleration sensor 84 is smaller than predetermined threshold value ΔGth).

(4) All the rotation speed sensors 82 (82FL, 82FR, 82RL, and 82RR) are effective.

(5) None of the wheels W (WFL, WFR, WRL, and WRR) of the vehicle 10 has a different-radius tire. For example, this condition is satisfied when the magnitude of the wheel speed of a specific wheel is different from the magnitudes of the wheel speeds of the other wheels by a predetermined ratio or less (e.g., 10% or less).

(6) The minimum value Vwmin of the wheel speeds of the four wheels is equal to or larger than a calculation execution lower limit vehicle speed Vdl.

When the rotation speed of the rotor is extremely low, the rotation speed sensors 82 have a difficulty in accurately detecting the wheel speed due to its structure, and thus the minimum vehicle speed for executing calculation is set. For example, the calculation execution tower limit vehicle speed Vdl is set to 10 km/h.

(7) The maximum value Vwmax of the wheel speeds of the four wheels is smaller than a calculation execution upper limit vehicle speed Vul.

When the vehicle speed is extremely high, the vehicle 10 incurs a lifting force, and the slip ratio becomes higher. Thus, the upper limit vehicle speed for executing calculation is set. For example, the calculation execution upper limit vehicle speed Vul is set to 200 km/h.

(8) The magnitude of a vehicle body deceleration is larger than the magnitude of a calculation execution lower limit deceleration and smaller than the magnitude of a calculation execution upper limit deceleration.

When at least one of the above-mentioned execution conditions is not satisfied, the CPU makes "No" determination at Step 420 to directly proceed to Step 450 at which the CPU sets the value of the first calculation execution flag XSCP1 to "0". On the other hand, when all the above-mentioned conditions are satisfied, the CPU makes "Yes" determination at Step 420 to proceed to Step 430 at which the CPU determines whether the coupling torque Tc1 of the first clutch 361 is equal to or smaller than the first threshold torque Tcth1 and the coupling torque Tc2 of the second clutch 362 is equal to or smaller than the first threshold torque Tcth1. The coupling torque Tc1 of the first clutch 361 is hereinafter also referred to as "first coupling torque Tc1". The coupling torque Tc2 of the second clutch 362 is hereinafter also referred to as "second coupling torque Tc2".

The first coupling torque Tc1 and the second coupling torque Tc2 are determined by a routine to be executed by the 4WD ECU 60 separately. For example, when the first coupling torque Tc1 and the second coupling torque Tc2 are both "0" the coupling torques of the first clutch 361 and the second clutch 362 (also referred to as "restraint force") are also "0". At this time, a driving force is not transmitted to the rear left wheel WRL and the rear right wheel WRR. Thus, the rear left wheel WRL and the rear right wheel WRR do not slip, and rotate in accordance with the speed of the vehicle 10 (actual vehicle body speed Vbr). As described above, when the first coupling torque Tc1 and the second coupling torque Tc2 are both "0", the first engagement state and the second engagement state are both the release state. In the first embodiment, the first threshold torque Tcth1 is set to "0".

When at least one of the first coupling torque Tc1 or the second coupling torque Tc2 is larger than the first threshold torque Tcth1, the CPU makes "No" determination at Step 430 to proceed to Step 450 at which the CPU sets the value of the first calculation execution flag XSCP1 to "0". Subsequently, the CPU proceeds to Step 495 to tentatively terminate the present routine.

On the other hand, when the first coupling torque Tc1 and the second coupling torque Tc2 are both equal to or smaller than the first threshold torque Tcth1, the CPU makes "Yes" determination at Step 430 to proceed to Step 440 at which the CPU sets the value of the first calculation execution flag XSCP1 to "1". Subsequently, the CPU proceeds to Step 495 to tentatively terminate the present routine.

In this manner, when the first coupling torque Tc1 and the second coupling torque Tc2 are both equal to or smaller than the first threshold torque Tcth1, the rear left wheel WRL and the rear right wheel WRR are both free wheels (driven wheels). Thus, the wheel speeds of the rear left wheel WRL and the rear right wheel WRR are equal to the wheel speeds of the front left wheel WFL and the front right wheel WFR serving as drive wheels. When the correction coefficient is calculated in this case, the correction coefficient Ki is calculated correctly. Therefore, in this case, the CPU calculates the correction coefficient. On the other hand, when at least one of the first coupling torque Tc1 or the second coupling torque Tc2 is larger than the first threshold torque Tcth1, the correction coefficient Ki may not be calculated correctly. Thus, in this case, the CPU stops calculation of the correction coefficient.

<Correction Coefficient Calculation>

Figure 5:
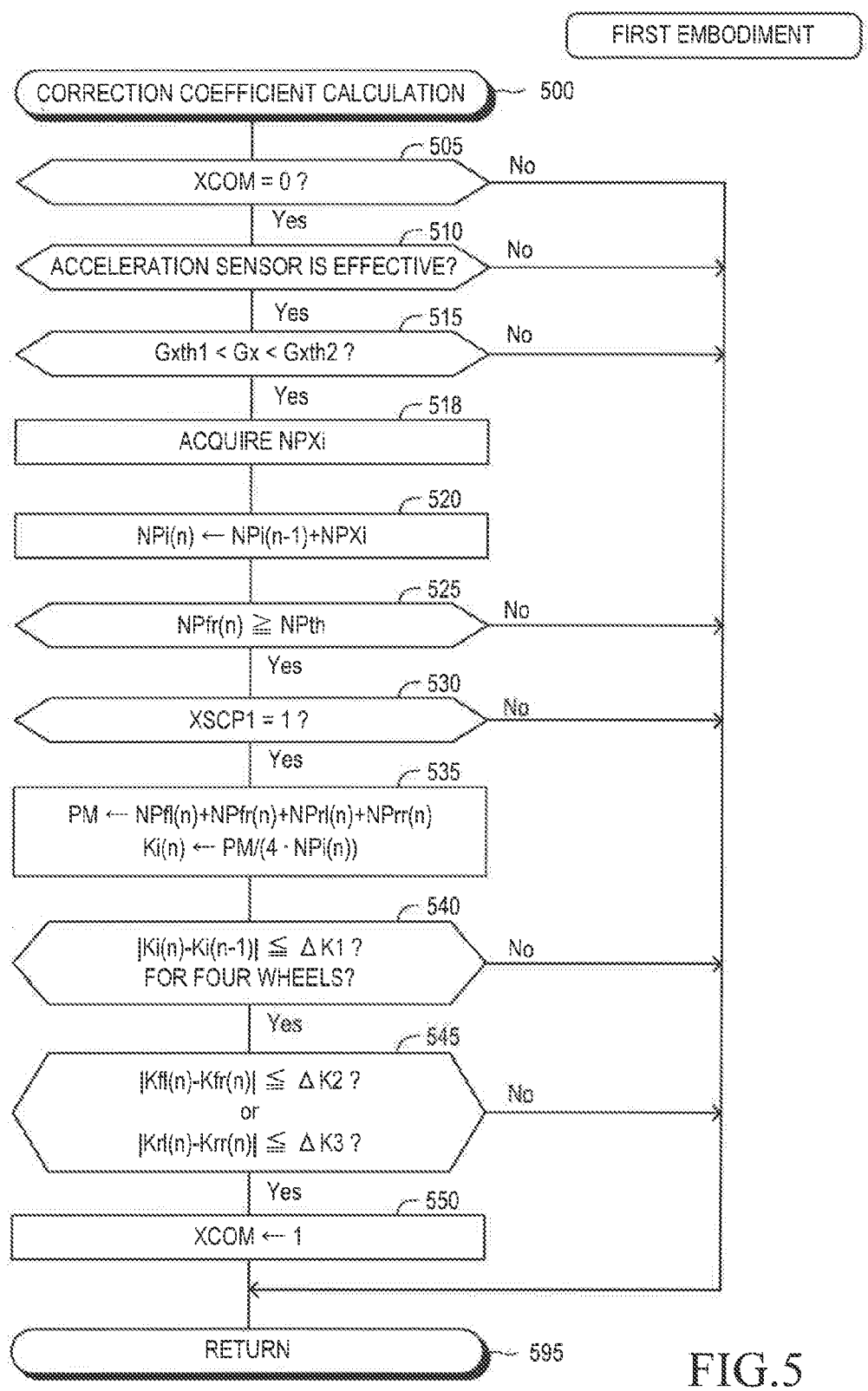
FIG. 5 is a flowchart for illustrating "correction coefficient calculation routine" executed by the CPU of the 4WD ECU illustrated in FIG. 1.

The CPU is configured to execute a correction coefficient calculation routine illustrated by a flowchart of FIG. 5 every time a constant time elapses. The integrated number of pulses NPi(n) is set to "0" at the time of IG on. The correction coefficient Ki is set to "1" at the time of IG on.

Thus, the CPU starts the process from Step 500 at a certain time point to proceed to Step 505 at which the CPU determines whether the value of the update completion flag XCOM is "0". When update of the correction coefficient is not complete (when value of update completion flag XCOM is "0"), the CPU makes "Yes" determination at Step 505 to proceed to Step 510 at which the CPU determines whether the longitudinal acceleration sensor 84 is effective.

When the longitudinal acceleration sensor 84 is effective (not broken), the CPU makes "Yes" determination at Step 510 to proceed to Step 515 at which the CPU determines whether the acquired longitudinal acceleration Gx is larger than a first threshold acceleration Gxth1 and is smaller than a second threshold acceleration Gxth2. When the acquired longitudinal acceleration Gx is larger than the first threshold acceleration Gxth1 and smaller than the second threshold acceleration Gxth2, the CPU makes "Yes" determination at Step 515 to proceed to Step 520. The first threshold acceleration Gxth1 has a negative value (namely, deceleration), and the second threshold acceleration Gxth2 has a positive value (namely, acceleration). The determination at Step 515 may be omitted because the execution conditions (3) and (8) for the above-mentioned correction coefficient calculation execution determination substantially define an acceleration/deceleration enabling calculation of the correction coefficient.

At Step 518, the CPU acquires the number of pulses NPXi calculated separately in a routine (not shown), and proceeds to Step 520 to calculate the integrated number of pulses NPi(n) in accordance with equation (3) given above. Subsequently, the CPU proceeds to Step 525 to determine whether the integrated number of pulses NPfr(n) corresponding to the front right wheel WFR is equal to or larger than a threshold integrated number of pulses NPth. When the integrated number of pulses NPfr(n) is equal to or larger than the threshold integrated number of pulses NPth, the CPU makes "Yes" determination at Step 525 to proceeds to Step 530 at which the CPU determines whether the value of the first calculation execution flag XSCP1 is "1". When the value of the first calculation execution flag XSCP1 is "1", the CPU makes "Yes" determination at Step 530 to proceed to Step 535 at which the CPU calculates the total sum PM of the integrated numbers of pulses of the four wheels and the correction coefficient Ki for each wheel in accordance with equation (4) and equation (5) given above. It suffices that the determination at Step 525 is executed for any one of the wheels, and the determination may be executed for the front left wheel WFL, the rear left wheel WRL, or the rear right wheel WRR instead of the front right wheel WFR.

Subsequently, the CPU proceeds to Step 540 to determine whether the magnitude of the time deviation |Ki(n)−Ki(n−1)| is equal to or smaller than the predetermined first deviation ΔK1 for all the wheels. The condition determined at this step is one (condition (a)) of the conditions (convergence conditions) for determining whether the correction coefficient Ki has converged.

When the magnitude of the time deviation for any one of the four wheels is larger than the predetermined first deviation ΔK1, the CPU makes "No" determination at Step 540, and directly proceeds to Step 595 to tentatively terminate the present routine. On the other hand, when the magnitudes of the time deviation for the four wheels are all equal to or smaller than the predetermined first deviation ΔK1, the CPU makes "Yes" determination at Step 540 to proceed to Step 545 at which the CPU determines whether at least one of the following determination condition (A) or (B) is satisfied.

[Determination Condition]

(A) The magnitude |Kfl(n)−Kfr(n)| of the front right and left wheel deviation is equal to or smaller than the predetermined second deviation ΔK2.

(B) The magnitude |Krl(n)−Krr(n)| of the rear right and left wheel deviation is equal to or smaller than the predetermined third deviation ΔK3.

The condition determined at this step is another (condition (b)) of the conditions (convergence conditions) for determining whether the correction coefficient Ki has converged. When none of the above-mentioned determination conditions (A) and (B) are satisfied, the CPU makes "No" determination at Step 545, and directly proceeds to Step 595 to tentatively terminate the present routine. Thus, when the CPU starts this routine again from Step 500 after the constant time, the CPU calculates (updates) the correction coefficient Ki. On the other hand, when at least one of the above-mentioned condition (A) or (B) is satisfied, the CPU makes "Yes" determination at Step 545 to proceed to Step 550 at which the CPU finishes update of the correction coefficient (set value of update completion flag XCOM to "1"), and proceeds to Step 595 to tentatively terminate the present routine.

When the CPU makes "No" determination at any one of Step 505, Step 510, Step 515, Step 525, and Step 530 the CPU directly proceeds to Step 595 to tentatively terminate the present routine.

<Wheel Speed Correction>

Figure 6:
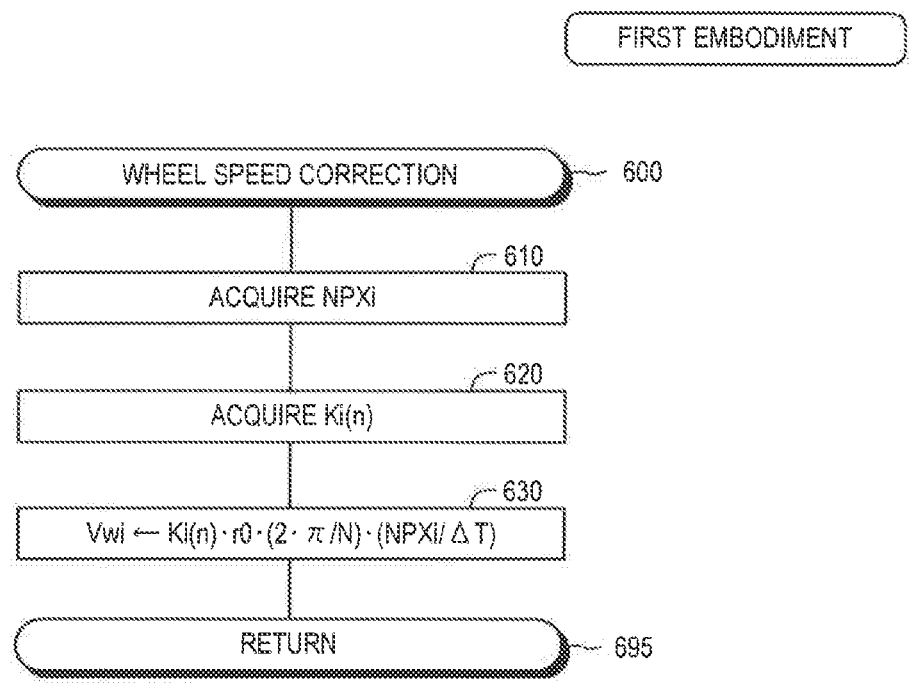
FIG. 6 is a flowchart for illustrating "wheel speed correction routine" executed by the CPU of the 4WD ECU illustrated in FIG. 1.

The CPU is configured to execute a wheel speed correction routine illustrated by a flowchart of FIG. 6 every time a constant time elapses.

Thus, the CPU starts the process from Step 600 at a predetermined timing to proceed to Step 610 at which the CPU acquires the number of pulses NPXi counted per unit period ΔT. Subsequently, the CPU proceeds to Step 620 to acquire the correction coefficient Ki(n) for each wheel. Subsequently, the CPU proceeds to Step 630 to calculate the corrected wheel speed Vwi for each wheel in accordance with equation (6) given above, and proceeds to Step 695 to tentatively terminate the present routine.

In this manner, the CPU executes the above-mentioned wheel speed correction irrespective of the value of the update completion flag XCOM. Thus, the CPU starts execution of the wheel speed correction at the time of IG on (initial value of correction coefficient Ki is 1). Further, the CPU is configured to execute the above-mentioned wheel speed correction irrespective of states of the first engagement state and the second engagement state.

As described above, the first device is configured to update (allow update of) the correction coefficient Ki when the rear left-wheel engagement state and the rear right-wheel engagement state are both the completely restraint state. The first device is configured to, when at least one of the rear left-wheel engagement state or the rear right-wheel engagement state is the incompletely restraint state, stop calculation of the correction coefficient Ki. Further, the first device is configured to, when at least one of the rear left-wheel engagement state or the rear right-wheel engagement state is the completely restraint state, stop calculation of the correction coefficient Ki.

Therefore, the first device can accurately calculate the correction coefficient to accurately correct the wheel speed of a four-wheel drive vehicle in which the gear ratio of the power transmission mechanism is set so that the rotation speed of the drive output device of a rear-wheel final gear device is higher than an average value of rotation speeds of the left and front right-wheel axles.

Second Embodiment

Next, a control device (hereinafter referred to as "second device") for a four-wheel drive vehicle according to a second embodiment of the present invention will be described. The second device is mainly different from the first device in that the second device executes "calculation of the correction coefficient" also when the first coupling torque Tc1 and the second coupling torque Tc2 are both equal to or larger than the second threshold torque Tcth2, which is larger than the first threshold torque Tcth1, and executes "calculation of the correction coefficient in which the increased speed ratio RZ is taken into consideration" at that time. Accordingly, this difference will be mainly described below.

When the first coupling torque Tc1 and the second coupling torque Tc2 are set to values (e.g., maximum value Tcmax (≥Tcth2)) for causing the clutch to be in the completely restraint state, driving forces to be transmitted to the rear left wheel WRL and the rear right wheel WRR are the maximum. When the vehicle 10 travels under this state, the rotation speed of the rear wheel is higher than the rotation speed of the front wheel by the increased speed ratio RZ. As a result, calculation of the correction coefficient Ki in accordance with equation (3) to equation (5) given above produces an inaccurate value of the correction coefficient Ki. In other words, the rotation speed of the rear wheel becomes higher, and thus the correction coefficient Ki is calculated with the wheel radius of the rear wheel being erroneously considered to be smaller than the actual wheel radius. However, the increased speed ratio RZ is a fixed value (1.02 in this example) set in advance, and thus even when the rear left wheel WRL or the rear right wheel WRR is a drive wheel, the correction coefficient Ki can be calculated accurately by considering an amount of increase in rotation speed of the rear wheel by the increased speed ratio HZ.

More specifically, when the first engagement state and the second engagement state are both the completely restraint state, the second device calculates the total sum PM of the integrated numbers of pulses NPi(n) of the respective wheels i in accordance with equation (7) given below, and calculates the correction coefficient Ki(n) for each wheel in accordance with equation (8) given below.

$$PM(n) = NPfl(n) + NPfr(n) + NPrl(n)/RZ + NPrr(n)/RZ \quad (7)$$

$$Ki(n) = PM/(4 \cdot NPi(n)) \quad \text{(front wheel)} \quad (8)$$
$$\quad\quad = PM/(4 \cdot NPi(n)/RZ) \quad \text{(rear wheel)}$$

The third and fourth terms on the right side of equation (7) are values obtained by dividing the integrated number of pulses NPrl(n) of the rear left wheel WRL and the integrated number of pulses NPrr(n) of the rear right wheel WRR by the increased speed ratio RZ, respectively. Those values correspond to the third and fourth terms on the right side of equation (4) given above, which are calculated during a period in which the first engagement state and the second engagement state are both the release state. That is, the third and fourth terms on the right side of equation (7) are converted into values smaller than the calculated integrated numbers of pulses NPi(n) by the increased speed ratio RZ.

In equation (8), the correction coefficients Ki(n) for the front left wheel WFL and the front right wheel WFR are calculated similarly to equation (5) given above. In contrast, the correction coefficients (correction coefficients for rear wheels) Ki(n) for the rear left wheel WRL and the rear right wheel WRR of equation (8) are obtained by dividing the integrated number of pulses NPi(n) by the increased speed ratio RZ. That is, the correction coefficients Ki(n) for the rear wheels are converted into values smaller than the integrated numbers of pulses NPi(n) by the increased speed ratio RZ.

Thus, when the first engagement state and the second engagement state are both the release state, the second device calculates the total sum PM of the integrated numbers of pulses in accordance with equation (4) given above, and calculates the correction coefficient Ki(n) for each wheel in accordance with equation (5). On the other hand, when the first engagement state and the second engagement state are both the completely restraint state, the second device calculates the total sum PM of integrated numbers of pulses in accordance with equation (7), and calculates the correction coefficient Ki(n) for each wheel in accordance with equation (8). The second device determines whether the above-mentioned convergence conditions are satisfied based on the correction coefficients Ki(n) calculated in this manner. When the convergence conditions are satisfied based on the correction coefficients Ki(n), the second device finishes update of those correction coefficients Ki(n).

(Specific Operation)

Figure 7:
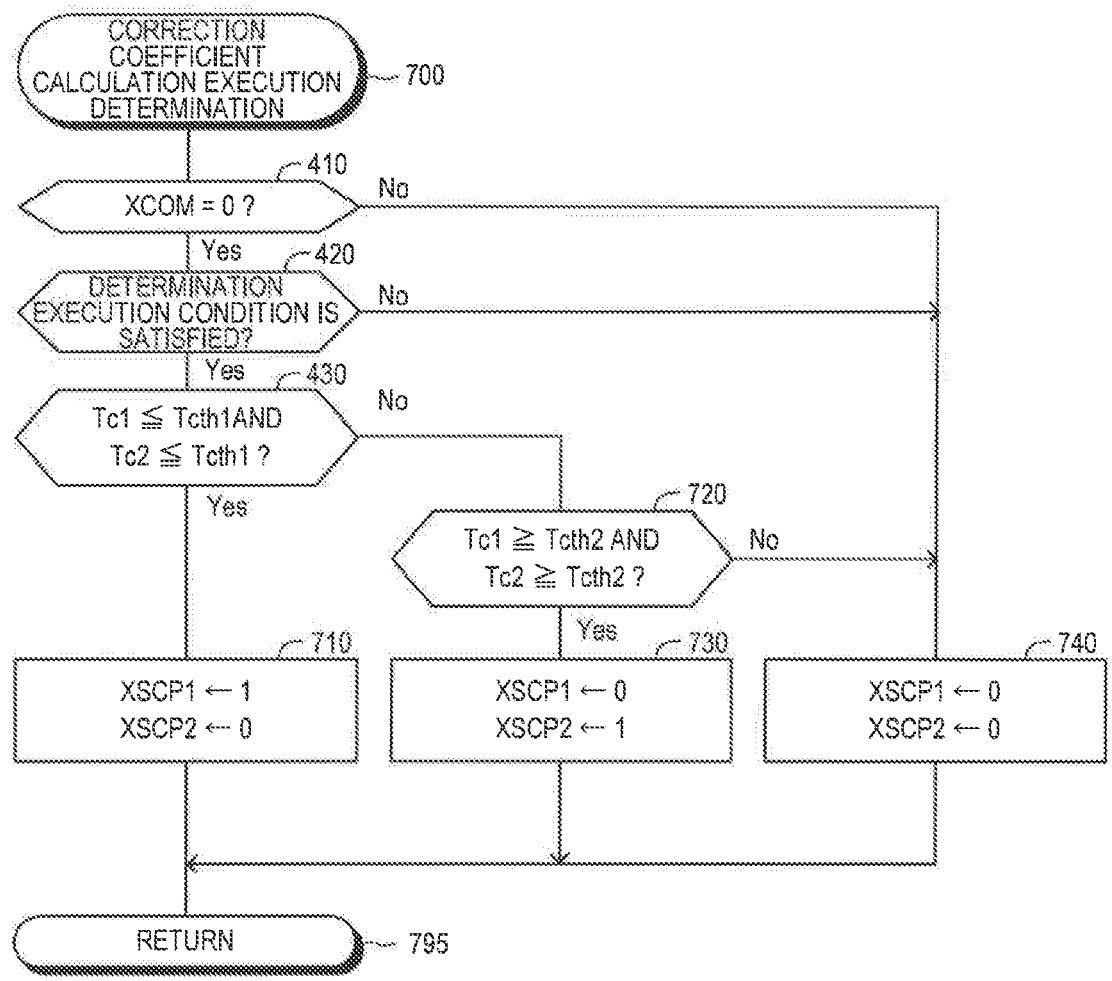
FIG. 7 is a flowchart for illustrating "correction coefficient calculation execution determination routine" executed by a CPU of a 4WD ECU of a control device for a four-wheel drive vehicle in a second embodiment of the present invention.
Figure 8:
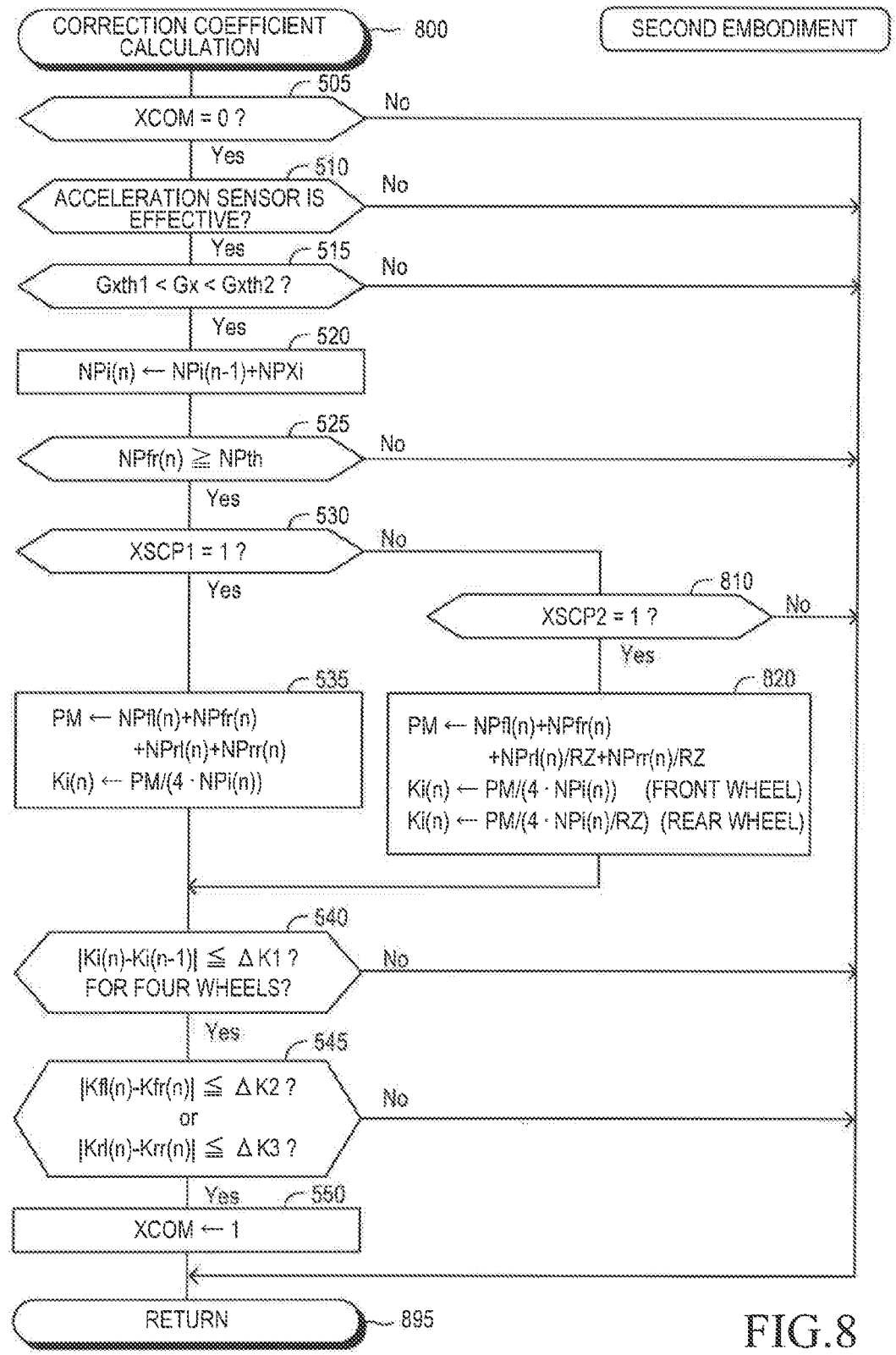
FIG. 8 is a flowchart for illustrating "correction coefficient calculation routine" executed by the CPU of the 4WD ECU of the control device for a four-wheel drive vehicle in the second embodiment of the present invention.

A CPU of a 4WD ECU 60A of the second device executes a correction coefficient calculation execution determination routine illustrated by a flowchart of FIG. 7, a correction coefficient calculation routine illustrated by a flowchart of FIG. 8, and a wheel speed correction routine illustrated by a flowchart of FIG. 6.

<Correction Coefficient Calculation Execution Determination>

Hereinafter, an actual operation of the second device with reference to FIG. 7 and FIG. 8 will be described. The CPU of the 4WD ECU 60A is configured to execute the correction coefficient calculation execution determination routine illustrated by the flowchart of FIG. 7 every time a constant time elapses. Similarly to the first device, the second device executes the wheel speed correction routine illustrated by the flowchart of FIG. 6, but this routine is already described, and a description thereof is omitted here.

The CPU thus starts the process from Step 700 at a predetermined timing to proceed to Step 410. Step 410 to Step 430 after Step 700 are the same processing steps as Step 410 to Step 430 illustrated in FIG. 4, and thus a description thereof is omitted here.

When the first coupling torque Tc1 and the second coupling torque Tc2 are both equal to or smaller than the first threshold torque Tcth1, the CPU makes "Yes" determination at Step 430 to proceed to Step 710. The CPU sets the value of the first calculation execution flag XSCP1 to "1" at Step 710, and sets the value of a second correction coefficient calculation execution flag XSCP2 to "0", and proceeds to Step 795 to tentatively terminate the present routine. The second correction coefficient calculation execution flag XSCP2 is hereinafter referred to as "second calculation execution flag XSCP2".

On the other hand, when at least one of the first coupling torque Tc1 or the second coupling torque Tc2 is larger than the first threshold torque Tcth1, the CPU makes "No" determination at Step 430 to proceed to Step 720 at which the CPU determines whether the first coupling torque Tc1 and the second coupling torque Tc2 are both equal to or larger than the second threshold torque Tcth2. When the first coupling torque Tc1 and the second coupling torque Tc2 are both equal to or larger than the second threshold torque Tcth2, the CPU makes "Yes" determination at Step 720 to proceed to Step 730 at which the CPU sets the value of the first calculation execution flag XSCP1 to "0" and the value of the second calculation execution flag XSCP2 to "1". When at least one of the first coupling torque Tc1 or the second coupling torque Tc2 is smaller than the second threshold torque Tcth2, the CPU makes "No" determination at Step 720 to proceed to Step 740 at which the CPU sets the values of the first calculation execution flag XSCP1 and the second calculation execution flag XSCP2 to "0".

<Correction Coefficient Calculation>

The CPU executes the correction coefficient calculation routine illustrated by the flowchart of FIG. 8 every time a constant time elapses. The integrated number of pulses NPi(n) and the correction coefficient Ki are set to "0" and "1" at the time of 1G on, respectively.

The CPU starts the process from Step 800 at a predetermined timing to proceed to Step 505. Step 505 to Step 550 after Step 800 are the same processing steps as Step 505 to Step 550 illustrated in FIG. 5, and thus a description thereof is omitted here. When the value of the first calculation execution flag XSCP1 is set to "0", the CPU makes "No" determination at Step 530 to proceed to Step 810 at which the CPU determines whether the value of the second calculation execution flag XSCP2 is "1". When the value of the second calculation execution flag XSCP2 is "1", the CPU makes "Yes" determination at Step 810 to proceed to Step 820 at which the CPU calculates the total sum PM of the integrated numbers of pulses in accordance with equation (7) and calculate the correction coefficient Ki(n) in accordance with equation (8). Subsequently, the CPU proceeds to Step 540. On the other hand, when the value of the second calculation execution flag XSCP2 is "0", the CPU makes "No" determination at Step 810, and directly proceeds to Step 895 to tentatively terminate the present routine.

In this manner, when the value of the first calculation execution flag XSCP1 is "1" in the correction coefficient calculation routine, the CPU of the second device selects Step 535, and when the value of the second calculation execution flag XSCP2 is "1", the CPU of the second device selects Step 820.

As described above, the second device is configured to execute calculation of the correction coefficient Ki only when the engagement state of the first dutch 361 and the engagement state of the second dutch 362 are both the release state, or when the engagement state of the first dutch 361 and the engagement state of the second clutch 362 are both the completely restraint state.

Further, when the engagement state of the first dutch 361 and the engagement state of the second dutch 362 are both the release state, the second device calculates a calculation parameter (e.g., integrated number of pulses NPi(n)) correlated to the rotation angle of each wheel in a predetermined period of time based on the wheel rotation speed signal of each wheel, and uses the calculation parameter to calculate the correction parameter Ki.

In addition, the second device is configured to, when the engagement state of the first clutch 361 and the engagement state of the second clutch 362 are both the completely restraint state, calculate the calculation parameter based on the wheel rotation speed signal of each wheel, and calculate the correction parameter Ki by using the calculation parameter NPfl(n) for the front left wheel WFL, the calculation parameter NPfr(n) for the front right wheel WFR, the value NPrl(n)/RZ obtained by dividing the calculation parameter NPrl(n) for the rear left wheel WRL by the increased speed ratio (predetermined ratio) RZ, and the value NPrr(n)/RZ obtained by dividing the calculation parameter NPrr(n) for the rear right wheel WRR by the increased speed ratio (predetermined ratio) RZ.

Thus, the second device considers an additional execution condition (Tc1≥Tcth2 and Tc2≥Tcth2) together with the execution condition (Tc1≤Tcth1 and Tc2≤Tcth1) in the first device as the execution condition for calculating the correction coefficient. That is, an additional execution condition that the engagement state of the first clutch 361 and the engagement state of the second dutch 362 are both the completely restraint state is added to the execution condition in the first device that the engagement state of the first clutch 361 and the engagement state of the second clutch 362 are both the release state. Therefore, with the second device, it is possible to increase the opportunity of executing calculation of the correction coefficient, and as a result, to finish calculation of the correction coefficient earlier.

Modification Example

The present invention is not limited to the embodiments described above. As described below, various modification examples can be employed within the scope of the present invention.

In the above-mentioned embodiments, the increased speed ratio RZ is set to 1.02. However, the increased speed ratio RZ may be set to any value that is larger than 1.

In the above-mentioned second embodiment, the second threshold torque Tcth2 is set to a constant value (value for causing clutch to be in completely restraint state, for example, maximum value Tcmax of coupling torque), but the second threshold torque Tcth2 may be set to a value correlated to a product of a road surface friction coefficient μi (i=rl or rr), which corresponds to each of the rear left wheel WRL and the rear right wheel WRR, and a vertical load on each wheel, namely, a friction force caused between each wheel and the road surface. According to the modification example, it is possible to substantially increase the opportunity of executing calculation of the correction coefficient compared to a case of setting the second threshold torque Tcth2 to a constant value (maximum value Tcmax of coupling torque).

In the above-mentioned embodiments, the first threshold torque Tcth1 is set to "0", but may be set to a value larger than "0" as long as the driving force does not substantially generate in the rear left wheel WRL and the rear right wheel WRR.

In the above-mentioned second embodiment, the correction coefficient Ki in the "calculation of the correct coefficient in which the increased speed ratio RZ is taken into consideration" may be calculated in accordance with equation (9) to equation (12) given below. That is, the CPU may be configured to calculate the correction coefficient Ki in accordance with equation (9) to equation (12) given below at Step 820A (not shown), which replaces Step 820 of FIG. 8.

$$Kfl(n)=(Vwafl(n)+Vwafr(n)+Vwarl(n)/RZ+Vwarr(n)/RZ)/(4 \cdot Vwafl(n)) \quad (9)$$

$$Kfr(n)=(Vwafl(n)+Vwafr(n)+Vwarl(n)/RZ+Vwarr(n)/RZ)/(4 \cdot Vwafr(n)) \quad (10)$$

$$Krl(n)=(Vwafl(n)+Vwafr(n)+Vwarl(n)/RZ+Vwarr(n)/RZ)/(4 \cdot Vwarl(n)/RZ) \quad (11)$$

$$Krr(n)=(Vwafl(n)+Vwafr(n)+Vwarl(n)/RZ+Vwarr(n)/RZ)/(4 \cdot Vwarr(n)/RZ) \quad (12)$$

The wheel speed average value Vwai(n) (i=fl, fr, rl, or rr) represents an average value of each wheel speed Vwi calculated during a period in which the first engagement state and the second engagement state are both the completely restraint state. That is, the wheel speed average value Vwai(n) is a value obtained by dividing the sum of wheel speeds, which are calculated during a period in which the first engagement state and the second engagement state are both the completely restraint state, by the number of times of calculation. The wheel speed average value Vwai(n) is calculated in accordance with equation (13) given below. The wheel speed average value Vwai(n) is one of the calculation parameters.

$$Vwai(n)=(Vwi(1)+Vwi(2)+ \ldots +Vwi(n))/n \quad (13)$$

In the above-mentioned embodiments, the second threshold torque Tcth2 is set to the maximum value Tcmax of the coupling torque, but may be set to a value smaller than the maximum value Tcmax of the coupling torque as long as the first clutch 361 and the second clutch 362 do not slip.

In the embodiments described above, the CPU of the 4WD ECU 60 executes the routines illustrated in FIG. 4 to FIG. 9. However, in place of the CPU of the 4WD ECU 60, a CPU of the brake ECU 70 may execute those routines, or a CPU of one ECU in which, for example, the 4WD ECU 60 and the brake ECU 70 are integrated may execute those routines.

In the embodiments described above, a clutch obtained by combining a multi-plate clutch and an electromagnetic clutch is used as the clutch device (coupling device) 36, but only a multi-plate clutch or only an electromagnetic clutch may be used. Further, a planetary gear mechanism may be used in the clutch device (coupling device) 36.

What is claimed is:

1. A wheel speed estimation device to be applied to a four-wheel drive vehicle, the four-wheel drive vehicle including:
a first coupling device configured to change a rear left-wheel engagement state, which is a state of engagement between a drive output device, to which a driving torque generated by a drive source is to be transmitted via a power transmission device, and a rear left-wheel axle, to which a rear left wheel is coupled, to any one of: a completely restraint state, which is a state in which the rear left-wheel axle rotates integrally with the drive output device; a release state, which is a state in which the rear left-wheel axle rotates freely relative to the drive output device; and an incompletely restraint state, which is a state in which the rear left-wheel axle rotates while slipping relative to the drive output device;
a second coupling device configured to change a rear right-wheel engagement state, which is a state of engagement between the drive output device and a rear right-wheel axle, to which a rear right wheel is coupled, to any one of: a completely restraint state, which is a state in which the rear right-wheel axle rotates integrally with the drive output device; a release state, which is a state in which the rear right-wheel axle rotates freely relative to the drive output device; and an incompletely restraint state, which is a state in which the rear right-wheel axle rotates while slipping relative to the drive output device; and
a controller configured to control the rear left-wheel engagement state by using the first coupling device and to control the rear right-wheel engagement state by using the second coupling device,
the four-wheel drive vehicle being configured such that: when the rear left-wheel engagement state is the completely restraint state while the four-wheel drive vehicle is traveling straight ahead, the power transmission device has, as a predetermined ratio larger than 1, a ratio of a rotation speed of the rear left-wheel axle to an average value of a rotation speed of a front left-wheel axle, to which a front left wheel is coupled, and a rotation speed of a front right-wheel axle, to which a front right wheel is coupled; and when the rear right-wheel engagement state is the completely restraint state while the four-wheel drive vehicle is traveling straight ahead, the power transmission device has a ratio of a rotation speed of the rear right-wheel axle to the average value as the predetermined ratio, the wheel speed estimation device comprising:
a plurality of rotation speed sensors configured to generate wheel rotation speed signals corresponding to rotation speeds of the front left wheel, the front right wheel, the rear left wheel, and the rear right wheel, respectively;
a correction parameter calculator configured to calculate, for each wheel and based on all the wheel rotation speed signals, a correction parameter that changes depending on a degree of influence given to a wheel speed of each wheel by a difference in wheel radius between wheels; and a wheel speed calculator configured to calculate the wheel speed of each wheel based on each of the wheel rotation speed signals and each correction parameter, wherein the correction parameter calculator is configured to stop calculation of the correction parameter when at least one of the rear left-wheel engagement state or the rear right-wheel engagement state is the incompletely restraint state.

2. A wheel speed estimation device according to claim 1, wherein the correction parameter calculator is further configured to stop calculation of the correction parameter when at least one of the rear left-wheel engagement state or the rear right-wheel engagement state is the completely restraint state.

3. A wheel speed estimation device according to claim 1, wherein the correction parameter calculator is configured to execute calculation of the correction parameter only when the rear left-wheel engagement state and the rear right-wheel engagement state are both the release state and only when the rear left-wheel engagement state and the rear right-wheel engagement state are both the completely restraint state, and wherein the correction parameter calculator is further configured to:

calculate, when the rear left-wheel engagement state and the rear right-wheel engagement state are both the release state, a calculation parameter correlated to a rotation angle of each wheel in a predetermined period based on each of the wheel rotation speed signals, to thereby calculate the correction parameter by using the calculation parameter; and calculate, when the rear left-wheel engagement state and the rear right-wheel engagement state are both the completely restraint state, the calculation parameter based on each of the wheel rotation speed signals, to thereby calculate the correction parameter by using the calculation parameter for the front left wheel, the calculation parameter for the front right wheel, a value obtained by dividing the calculation parameter for the rear left wheel by the predetermined ratio, and a value obtained by dividing the calculation parameter for the rear right wheel by the predetermined ratio.

4. A wheel speed estimation device according to claim 1, wherein the correction parameter calculator is configured to update, during one trip period from start of a current operation of the four-wheel drive vehicle to end of the current operation, the correction parameter every time a predetermined period elapses when calculation of the correction parameter is not stopped, and wherein the correction parameter calculator is further configured to:

initialize the correction parameter when the four-wheel drive vehicle starts the current operation; and stop update of the correction parameter from when a first convergence condition and a second convergence condition are both satisfied until the end of the current operation, the first convergence condition being satisfied when a magnitude of a deviation between a current correction parameter, which is a correction parameter updated at a current time and a previous correction parameter, which is a correction parameter updated the predetermined period before the current time, at which the correction parameter is updated, is equal to or smaller than a first predetermined deviation, the second convergence condition being satisfied when at least one of a condition that a magnitude of a deviation between a correction parameter for the front left wheel and a correction parameter for the front right wheel is equal to or smaller than a second predetermined deviation or a condition that a magnitude of a deviation between a correction parameter for the rear left wheel and a correction parameter for the rear right wheel is equal to or smaller than a third predetermined deviation is satisfied.

5. A wheel speed estimation device according to claim 2, wherein the correction parameter calculator is configured to update, during one trip period from start of a current operation of the four-wheel drive vehicle to end of the current operation, the correction parameter every time a predetermined period elapses when calculation of the correction parameter is not stopped, and wherein the correction parameter calculator is further configured to:

initialize the correction parameter when the four-wheel drive vehicle starts the current operation; and stop update of the correction parameter from when a first convergence condition and a second convergence condition are both satisfied until the end of the current operation, the first convergence condition being satisfied when a magnitude of a deviation between a current correction parameter, which is a correction parameter updated at a current time, and a previous correction parameter, which is a correction parameter updated the predetermined period before the current time, at which the correction parameter is updated, is equal to or smaller than a first predetermined deviation, the second convergence condition being satisfied when at least one of a condition that a magnitude of a deviation between a correction parameter for the front left wheel and a correction parameter for the front right wheel is equal to or smaller than a second predetermined deviation or a condition that a magnitude of a deviation between a correction parameter for the rear left wheel and a correction parameter for the rear right wheel is equal to or smaller than a third predetermined deviation is satisfied.

6. A wheel speed estimation device according to claim 3, wherein the correction parameter calculator is configured to update, during one trip period from start of a current operation of the four-wheel drive vehicle to end of the current operation the correction parameter every time a predetermined period elapses when calculation of the correction parameter is not stopped, and wherein the correction parameter calculator is further configured to:

initialize the correction parameter when the four-wheel drive vehicle starts the current operation; and stop update of the correction parameter from when a first convergence condition and a second convergence condition are both satisfied until the end of the current operation, the first convergence condition being satisfied when a magnitude of a deviation between a current correction parameter, which is a correction parameter updated at a current time, and a previous correction parameter, which is a correction parameter updated the predetermined period before the current time, at which the correction parameter is updated, is equal to or smaller than a first predetermined deviation, the second convergence condition being satisfied when at least one of a condition that a magnitude of a deviation between a correction parameter for the front left wheel and a correction parameter for the front right wheel is equal to or smaller than a second predetermined deviation or a condition that a magnitude of a deviation between a correction parameter for the rear left wheel and a correction parameter for the rear right wheel is equal to or smaller than a third predetermined deviation is satisfied.

* * * * *